April 9, 1957   L. B. CLAYTON   2,788,106
WALLBOARD CONVEYOR
Filed Sept. 3, 1954   2 Sheets-Sheet 2
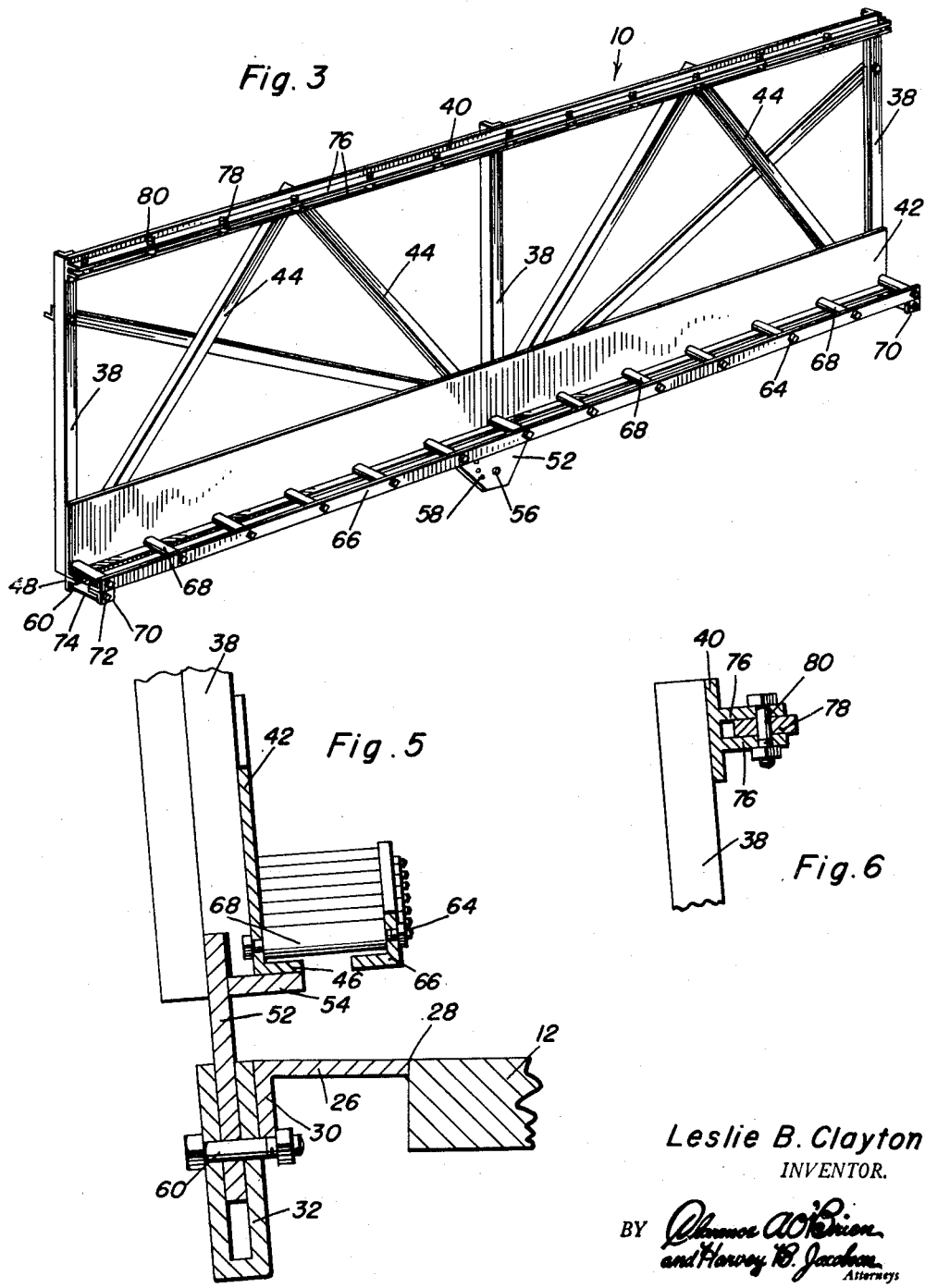
Leslie B. Clayton
INVENTOR.

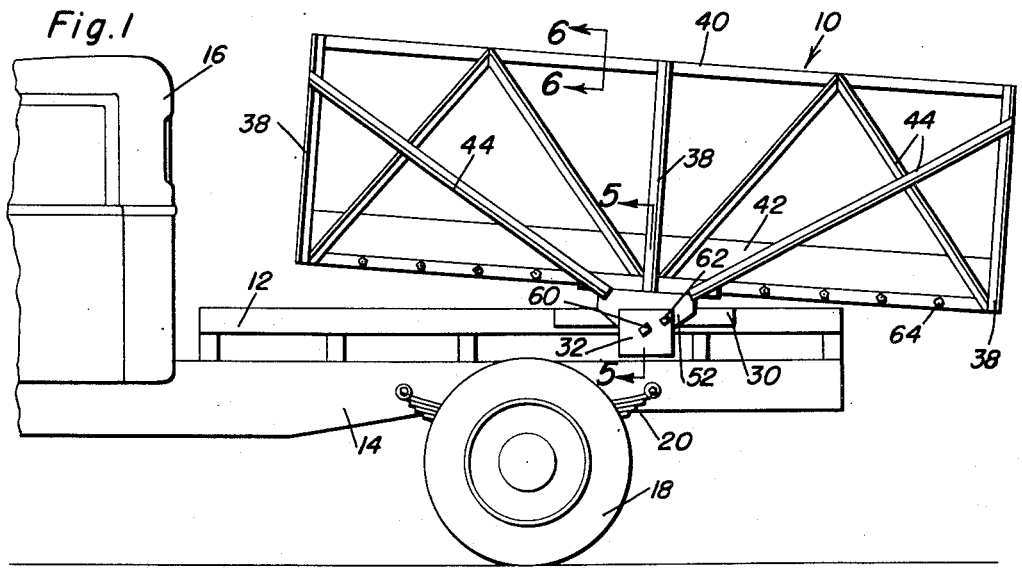
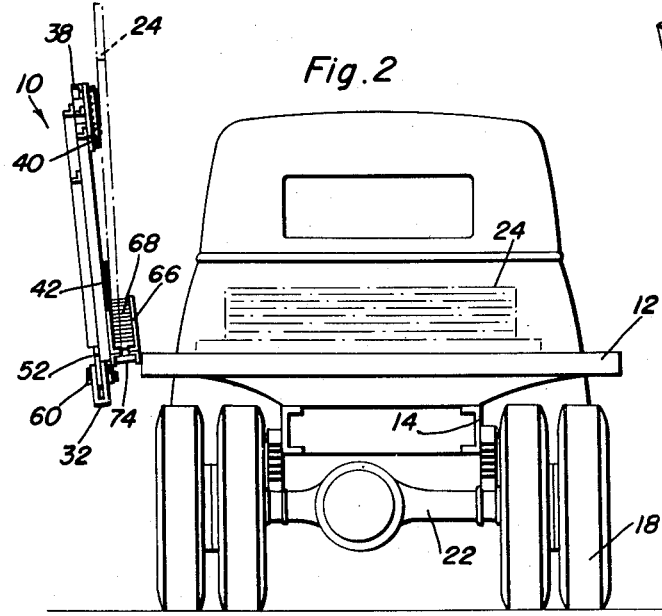
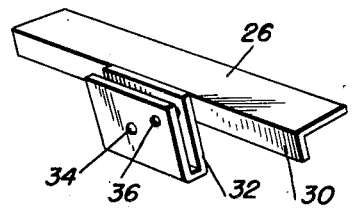
Leslie B. Clayton
INVENTOR.

United States Patent Office 2,788,106
Patented Apr. 9, 1957

2,788,106

WALLBOARD CONVEYOR

Leslie B. Clayton, Oklahoma City, Okla.

Application September 3, 1954, Serial No. 454,185

9 Claims. (Cl. 193—35)

This invention relates to a wallboard conveyor and more specifically provides a device for use in moving wallboard from a truck or other carrier into a storage warehouse or place of use.

An object of this invention is to provide a wall board conveyor especially adapted for attachment to a truck body for conveying wallboard or the like from the truck to a warehouse or place of use by utilizing the natural force of gravity as a motivating power for the conveyor.

Another object of the present invention is to provide a wallboard conveyor removably attached to a truck for moving wallboard from the truck to a desired area by the use of gravity thereby increasing the efficiency of the truck unloading operation and decreasing the time and labor expended therein.

A still further object of the present invention is to provide a truck conveyor that will support a plurality of pieces of wallboard substantially on edge for movement down an inclined ramp having rollers thereon wherein the wallboard will be conveyed from one position to another.

Yet another important feature of the present invention is to provide a wallboard conveyor that is simple in construction, easy to attach to existing trucks, efficient in use, well adapted for its intended purposes and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view showing the wallboard conveyor of the present invention secured alongside the supporting platform of a truck;

Figure 2 is an end elevational view showing the relationship between the wallboard conveyor and the truck body;

Figure 3 is a perspective view showing the wallboard conveyor detached from the truck;

Figure 4 is a perspective view showing the mounting bracket for securing the conveyor of the present invention to the truck;

Figure 5 is a detailed, vertical sectional view taken substantially upon the plane passing along section line 5—5 of Figure 1 showing the details of construction of the conveyor mounting bracket and the conveyor; and Figure 6 is a detailed sectional view taken substantially upon a plane passing along section line 6—6 of Figure 1 showing the details of construction of the upper rollers for supporting the wallboard.

Referring now specifically to the drawings, it will be seen that the numeral 10 generally designates the wallboard conveyor of the present invention for attachment to the side edge of a flat truck body 12 having the usual supporting frame 14, cab 16, ground engaging wheels 18, supporting springs 20 and axle housing 22 wherein the flat body 12 is used for transporting a plurality of sheets of wallboard 24. The wallboard conveyor 10 of the present invention is used for unloading the wallboard 24 from the truck platform 12 into a warehouse for storage or into a building, such as a dwelling house or the like, for use wherein the unloading operation will be facilitated by the wallboard conveyor 10.

The wallboard conveyor 10 includes a generally elongated angle iron member 26 secured to the side edge of the truck body 12, as by welding 28 or other similar fastening means. The depending leg 30 of the right angle member 26 is inclined inwardly toward the body 12 and a U-shaped bracket 32 is secured to the outer face of the depending leg 30 wherein the legs of the U-shaped member 32 are inclined inwardly and downwardly toward the body 12 of the truck. The right angle member 26 and the bracket 32 are positioned generally rearwardly of the rear wheels 18 and in spaced relation to the rear end of the flat truck body 12. As shown in Figure 4, the center of the U-shaped bracket 32 is provided with an aperture 34 in each leg thereof and adjacent the upper corner of the U-shaped member 32 is also provided an aperture 36 through both legs of the U-shaped member 32 for a purpose described hereinafter.

The main portion of the conveyor 10 includes a plurality of vertically extending and longitudinally spaced angle structure members 38 that are spaced by an upper longitudinal rail 40 and a lower longitudinal plate 42. The lower plate 42 and the upper rail 40 are interconnected by a series of cross-braces 44 that are also constructed of angle material. The lower end of the plate 42 is provided with an inwardly extending ledge 46 and a right angle member 48 is provided with a horizontal ledge 50 engaging the surface thereof for a purpose described hereinafter. As shown in Figure 5, the central portion of the plate 42 is secured to a depending plate 52 having a laterally extending portion 54 engaging the undersurface of the inturned edge 46 of the plate 42 thereby rigidly securing the depending plate 52 to the longitudinal plate 42. The depending plate 52 is generally polygonal in shape and includes a central aperture 56 and a series of arcuately spaced and arcuately arranged apertures 58 that sequentially align with the aperture 36 in the U-shaped bracket 34. A pivot bolt 60 is positioned through the apertures 34 in the U-shaped bracket 32 and through the aperture 56 in the plate 52 after the plate 52 has been inserted between the legs of the U-shaped member 32 thereby pivotally securing the plate 52 and the framework of the conveyor 10 to the bracket 32. A lock bolt 62 is inserted through the aperture 36 in the U-shaped bracket 32 and one of the selective apertures 58 in the plate 52 thereby selectively adjusting the angular or inclined position of the wallboard conveyor 10.

Secured on the outer surface of the longitudinal plate 42 is a plurality of supporting bolts 64 that extend through and support a right angular member 66 in spaced relation to the plate 42. A roller 68 is provided on each of the bolts 64 wherein the rollers 68 form an inclined surface for moving wallboard or similar material therealong. At each end of the outer right angle member 66 is a right angled bracket 70 for receiving a bolt 72 that supports a roller 74 thereunder for assuring adequate support for the wallboard as it moves off of the rollers 68. The longitudinal rail 40 is provided with a pair of outwardly extending and vertically spaced lugs 76 for rotatably supporting a plurality of rollers 78 mounted on substantially vertical bolts 80 that extend through the lugs 76 thereby forming a rolling support for the wallboard adjacent the upper edge thereof.

In operation, the wallboard conveyor 10 is attached to the side edge of the truck body 12 with the rollers 68 forming an inclined path of movement for the wallboard 24 when it is positioned along one longitudinal edge onto the rollers 68. Due to the inclination of the bracket 32 and the framework of the conveyor 10, the wallboard 24 will lean against the rollers 78 adjacent the upper edge thereof wherein the wallboard 24 will be provided with adequate supports and will roll down the inclined path formed by the rollers 68 under the force of gravity. Obviously, by manipulation of the framework and selective alignment of the aperture 58 with the aperture 36 and positioning of the lock bolt 62, the angular position of the conveyor 10 may be adjusted as desired for changing the speed and other characteristics of movement of the wallboard 24 downwardly over the rollers 68. It will be understood that by removal of the bolts 60 and 62, the framework portion of the conveyor 10 may be easily removed for storage or for utilizing the truck for other purposes as well as for transportation.

It will be understood that spherical rollers may be used on the upper edge thereof for engaging and supporting the upper longitudinal edge of the wallboard and it will be further understood that two or more pieces of wallboard may be positioned on the conveyor 10 at the same time thereby expediting the unloading of the wallboard 24.

If desirable, extensions may be provided for extending the effective path of the rollers 68 especially where it is desired to transport the wallboard 24 to a remote position that is not accessible to the truck thereby eliminating the time consumed in hand-carrying the wallboard to the desired location. While this extension is not illustrated, it will be understood that the details of construction are substantially the same as the conveyor itself especially the details of construction of the rollers for supporting the wallboard as it is being unloaded from the truck body 12. Preferably the major portions of the conveyor 10 are constructed of aluminum or other lightweight materials thereby permitting easy handling of the lightweight device.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A wallboard conveyor comprising a bracket for attachment to a support, a framework adjustably secured to said bracket, a plurality of horizontally disposed rollers on said framework forming an inclined path of movement for a sheet of wallboard positioned on edge on the rollers, and a plurality of vertically disposed rollers spaced above the lower edge of said framework for engaging the sheet of wallboard in spaced relation to the bottom edge thereof wherein the sheet of wallboard will be moved along the rollers by the force of gravity.

2. A wallboard conveyor comprising a bracket for attachment to a support, a framework adjustably pivotally secured to said bracket, a plurality of horizontally disposed rollers on said framework forming an inclined path of movement for a sheet of wallboard positioned on edge on the rollers, and a plurality of vertically disposed rollers spaced above the lower edge of said framework for engaging the sheet of wallboard in spaced relation to the bottom edge thereof, said bracket being inclined outwardly thereby inclining said framework outwardly for supporting said wallboard in an inclined vertical plane.

3. A wallboard conveyor comprising a bracket for attachment to a support, a framework adjustably pivotally secured to said bracket, a plurality of horizontally disposed rollers on said framework forming an inclined path of movement for a sheet of wallboard positioned on edge on the rollers, and a plurality of vertically disposed rollers adjacent the upper edge of said framework for engaging the sheet of wallboard adjacent the upper edge thereof, a depending plate secured to said framework, said bracket receiving said plate, a bolt extending through said bracket and plate for pivotally securing the framework to the bracket for adjusting the angle of inclination of the path of movement of the wallboard thereby varying the rate of movement thereof caused by the force of gravity.

4. A wallboard conveyor comprising a bracket for attachment to a vehicle body, a framework adjustably pivotally secured to said bracket, a plurality of horizontally disposed rollers on said framework forming an inclined path of movement for a sheet of wallboard positioned on edge on the rollers, and a plurality of vertically disposed rollers adjacent the upper edge of said framework for engaging the sheet of wallboard adjacent the upper edge thereof, a depending plate secured to said framework, said bracket being substantially U-shaped for receiving said plate, a pivot bolt extending through said bracket and plate for pivotally securing the framework to the bracket, and a series of apertures in said plate in spaced relation about said pivot bolt, an aperture in said bracket in spaced relation to the pivot bolt for selective alignment with one of the apertures in said plate, and a locking bolt extending through said aligned apertures for locking the framework in adjusted inclined position wherein said wallboard will be moved over the rollers by the force of gravity.

5. A wallboard conveyor comprising a bracket for attachment to a vehicle body, a framework adjustably pivotally secured to said bracket, a plurality of horizontally disposed rollers on said framework forming an inclined path of movement for a sheet of wallboard positioned on edge on the rollers, and a plurality of vertically disposed rollers adjacent the upper edge of said framework for engaging the sheet of wallboard adjacent the upper edge thereof, a depending plate secured to said framework, said bracket being substantially U-shaped for receiving said plate, a pivot bolt extending through said bracket and plate for pivotally securing the framework to the bracket, and a series of apertures in said plate in spaced relation about said pivot bolt, an aperture in said bracket in spaced relation to the pivot bolt for selective alignment with one of the apertures in said plate, and a locking bolt extending through said aligned apertures for locking the framework in adjusted inclined position wherein said wallboard will be moved over the rollers by the force of gravity, said bracket being inclined outwardly thereby inclining said framework outwardly for supporting said wallboard in inclined position.

6. A wallboard conveyor comprising a bracket for attachment to a load supporting body, a framework adjustably secured to said bracket, a plurality of horizontally disposed rollers on said framework forming an inclined path of movement for a sheet of wallboard positioned on edge on the rollers, and a plurality of vertically disposed rollers adjacent the upper edge of said framework for engaging the sheet of wallboard adjacent the upper edge thereof, said rollers permitting movement of the wallboard therealong caused by the force of gravity.

7. A conveyor for sheets of substantially rigid material comprising a bracket to be mounted on a support, an elongated framework, means adjustably supporting said framework on said bracket, a projecting ledge on said framework adjacent the bottom thereof, roller means on said ledge for supporting a sheet of material positioned on edge to permit movement of the sheet of material along the ledge, roller means disposed on said framework in spaced relation to the ledge for engagement with the surface of the sheet of material in spaced relation to the lower edge thereof, said roller means on the framework being slightly spaced from a vertical plane passing through the roller means on said ledge thereby supporting the sheet of material in self-sustaining inclined position during movement thereof.

8. A conveyor for sheets of substantially rigid material comprising a bracket to be mounted on a support, an elongated framework, means adjustably supporting said framework on said bracket, a projecting ledge on said framework adjacent the bottom thereof, roller means on said ledge for supporting a sheet of material positioned on edge to permit movement of the sheet of material along the ledge, roller means disposed on said framework in spaced relation to the ledge for engagement with the surface of the sheet of material in spaced relation to the lower edge thereof, said roller means on the framework being slightly spaced from a vertical plane passing through the roller means on said ledge thereby supporting the sheets of material in self-sustaining inclined position during movement thereof, said roller means on the ledge including a plurality of rollers each being mounted for rotation about an inclined horizontal axis, said roller means on the framework including a plurality of rollers each being mounted for rotation about an inclined vertical axis.

9. A conveyor for sheets of substantially rigid material comprising a bracket to be mounted on a support, an elongated framework, means adjustably supporting said framework on said bracket, a projecting ledge on said framework adjacent the bottom thereof, roller means on said ledge for supporting a sheet of material positioned on edge to permit movement of the sheet of material along the ledge, roller means disposed on said framework in spaced relation to the ledge for engagement with the surface of the sheet of material in spaced relation to the lower edge thereof, said roller means on the framework being slightly spaced from a vertical plane passing through the roller means on said ledge thereby supporting the sheet of material in self-sustaining inclined position during movement thereof, said framework supporting means permitting adjustable movement about substantially a horizontal axis for inclining the ledge and the roller means thereon wherein the sheets of material will move along the roller means by the force of gravity.

References Cited in the file of this patent
UNITED STATES PATENTS

| | | |
|---|---|---|
| 252,960 | Moore | Jan. 31, 1882 |
| 480,824 | McKinnon | Aug. 16, 1892 |
| 1,286,801 | Schumacher et al. | Dec. 3, 1918 |
| 1,932,955 | Coppinger | Oct. 31, 1933 |
| 2,314,792 | Korner | Mar. 23, 1943 |
| 2,411,821 | Choat | Nov. 26, 1946 |